United States Patent
Kobata

(10) Patent No.: US 10,329,102 B2
(45) Date of Patent: Jun. 25, 2019

(54) WORKPIECE LOADING METHOD

(71) Applicant: HITACHI ZOSEN FUKUI CORPORATION, Awara-shi, Fukui (JP)

(72) Inventor: Mitsunori Kobata, Awara (JP)

(73) Assignee: HITACHI ZOSEN FUKUI CORPORATION, Awara-shi, Fukui (JP)

( * ) Notice: Subject to any disclaimer, the term of this patent is extended or adjusted under 35 U.S.C. 154(b) by 0 days.

(21) Appl. No.: 15/506,093

(22) PCT Filed: Aug. 27, 2015

(86) PCT No.: PCT/JP2015/004330
§ 371 (c)(1),
(2) Date: Feb. 23, 2017

(87) PCT Pub. No.: WO2016/051657
PCT Pub. Date: Apr. 7, 2016

(65) Prior Publication Data
US 2017/0297831 A1    Oct. 19, 2017

(30) Foreign Application Priority Data

Sep. 30, 2014  (JP) .............................. 2014-202513

(51) Int. Cl.
*B65G 57/04* (2006.01)
*B65H 29/16* (2006.01)
(Continued)

(52) U.S. Cl.
CPC .............. *B65G 57/04* (2013.01); *B65G 57/11* (2013.01); *B65H 29/16* (2013.01); *B65H 29/18* (2013.01);
(Continued)

(58) Field of Classification Search
CPC ........ B65G 57/04; B65G 57/11; B65H 29/18; B65H 29/30; B65H 31/3063; B65H 31/24; B65H 31/20; B65H 29/16
(Continued)

(56) References Cited

U.S. PATENT DOCUMENTS 2,527,911 A * 10/1950 Buccicone ............. B65H 29/30
 198/579
3,131,819 A * 5/1964 Ducayet, Jr. ........... B65H 31/32
 271/213
(Continued)

FOREIGN PATENT DOCUMENTS

JP         56-112034 U      8/1981
JP        2001-335213 A    12/2001
(Continued)

OTHER PUBLICATIONS

International Search Report dated Nov. 24, 2015 in PCT/JP2015/004330 and English translation thereof.

*Primary Examiner* — Lynn E Schwenning
(74) *Attorney, Agent, or Firm* — Muncy, Geissler, Olds & Lowe, P.C.

(57) ABSTRACT

The present invention is directed to a method of loading workpieces using a piler conveyor P including a first conveyor which sequentially conveys the workpieces by continuous operation at a first speed, a second conveyor which magnetically attracts, on a lower surface, the workpieces passed from the first conveyor for sequential conveyance by intermittent operation, and a loading frame where the workpieces are placed, the method including a first step S1 of gradually accelerating the second conveyor to the second speed, a second step S2 of operating the second conveyor at the second speed and passing the workpieces 1 from the first conveyor to the second conveyor, a third step S3 of gradually decelerating the second conveyor from the second speed
(Continued)

for operation, and a fourth step S4 of stopping the second conveyor and causing the second conveyor to lose a magnetic force and dropping a workpiece 1 positioned above the loading frame onto the loading frame 30, wherein the first speed and the second speed are set at an equal constant speed.

5 Claims, 8 Drawing Sheets

(51) Int. Cl.
    *B65H 29/30*     (2006.01)
    *B65G 57/11*     (2006.01)
    *B65H 29/18*     (2006.01)
    *B65H 31/20*     (2006.01)
    *B65H 31/24*     (2006.01)
    *B65H 31/30*     (2006.01)

(52) U.S. Cl.
    CPC ............. *B65H 29/30* (2013.01); *B65H 31/20* (2013.01); *B65H 31/24* (2013.01); *B65H 31/3063* (2013.01); *B65H 2301/4473* (2013.01); *B65H 2301/44734* (2013.01); *B65H 2404/283* (2013.01); *B65H 2405/3311* (2013.01); *B65H 2513/10* (2013.01); *B65H 2557/242* (2013.01); *B65H 2701/1311* (2013.01); *B65H 2701/173* (2013.01)

(58) Field of Classification Search
    USPC ...................................................... 414/794.9
    See application file for complete search history.

(56) References Cited

U.S. PATENT DOCUMENTS

| | | | | |
|---|---|---|---|---|
| 3,748,797 A * | 7/1973 | Deines | .................... | B65B 35/50 |
| | | | | 414/788.1 |
| 3,836,018 A * | 9/1974 | Dawson | ................. | B65G 57/04 |
| | | | | 414/790.4 |
| 4,278,381 A * | 7/1981 | Blomquist | ........... | B23Q 7/1431 |
| | | | | 104/288 |
| 4,475,863 A * | 10/1984 | Blatt | .................... | B21D 43/105 |
| | | | | 414/589 |
| 4,939,891 A * | 7/1990 | Podini | ..................... | B65B 5/106 |
| | | | | 414/791.6 |
| 5,601,389 A * | 2/1997 | Minami | .................. | B42C 19/02 |
| | | | | 412/11 |
| 5,893,701 A * | 4/1999 | Pruett | ..................... | B65B 23/14 |
| | | | | 198/419.1 |
| 2003/0039536 A1* | 2/2003 | Bjorn | ..................... | B65G 57/04 |
| | | | | 414/793.3 |
| 2005/0189703 A1* | 9/2005 | Okazaki | ................. | B65G 57/04 |
| | | | | 271/207 |
| 2007/0147981 A1* | 6/2007 | Moncrief | ................ | B65H 1/30 |
| | | | | 414/798.6 |
| 2008/0131248 A1* | 6/2008 | Friz | ......................... | B66C 13/04 |
| | | | | 414/561 |
| 2009/0000440 A1* | 1/2009 | Graushar | .............. | B26D 1/085 |
| | | | | 83/52 |

FOREIGN PATENT DOCUMENTS

| | | |
|---|---|---|
| JP | 2004-160469 A | 6/2004 |
| JP | 2005-179031 A | 7/2005 |
| JP | 2009-202979 A | 9/2009 |
| JP | 2010-70312 A | 4/2010 |
| JP | 5483441 B2 | 5/2014 |

* cited by examiner

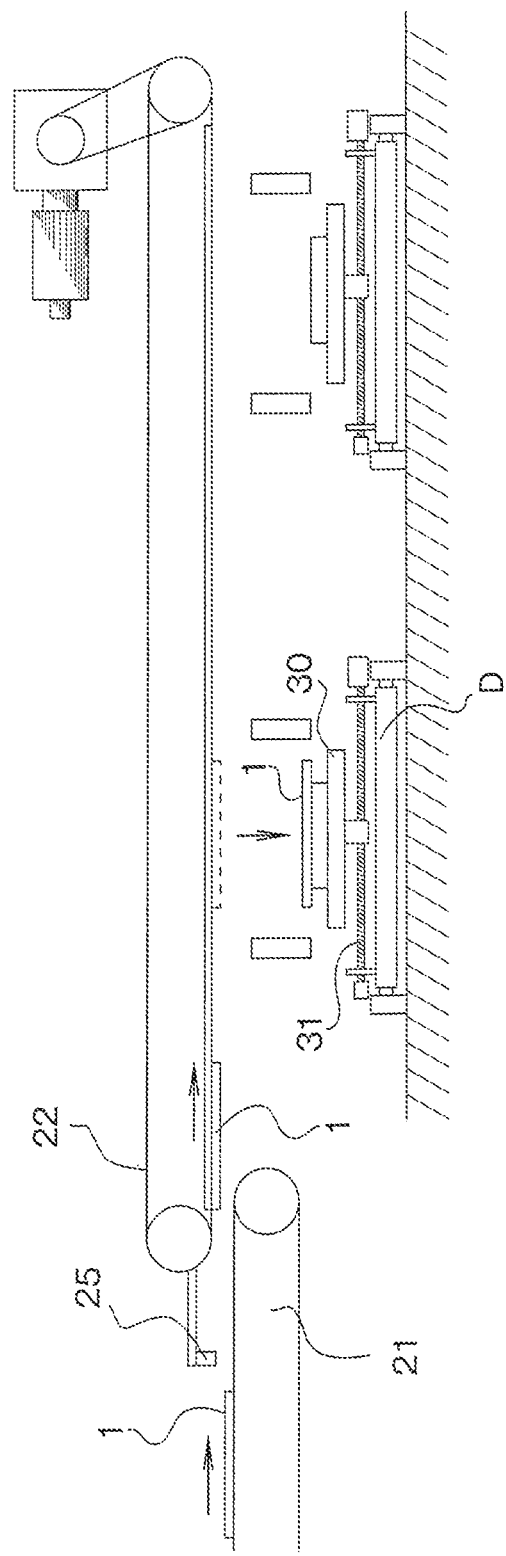

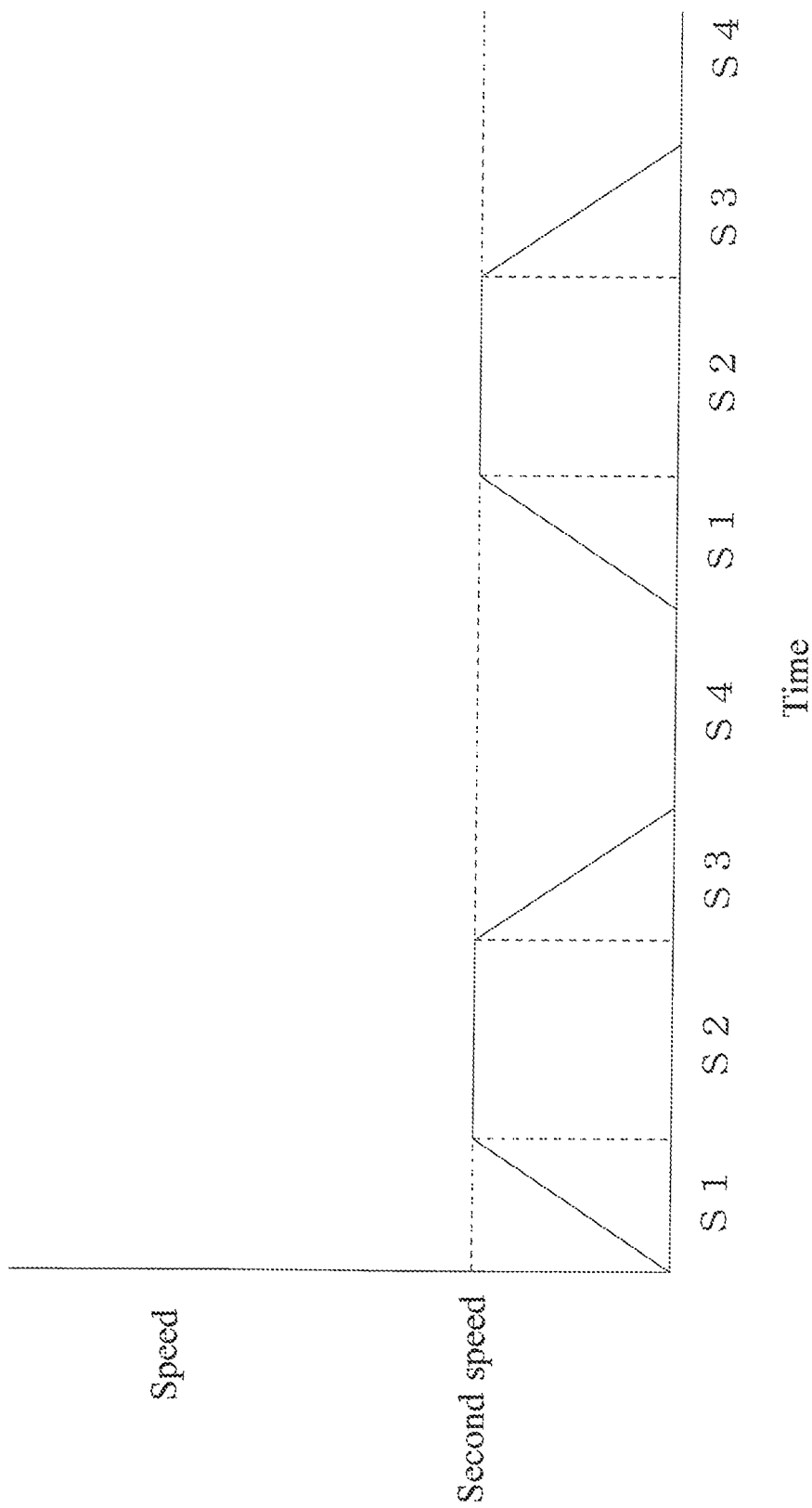

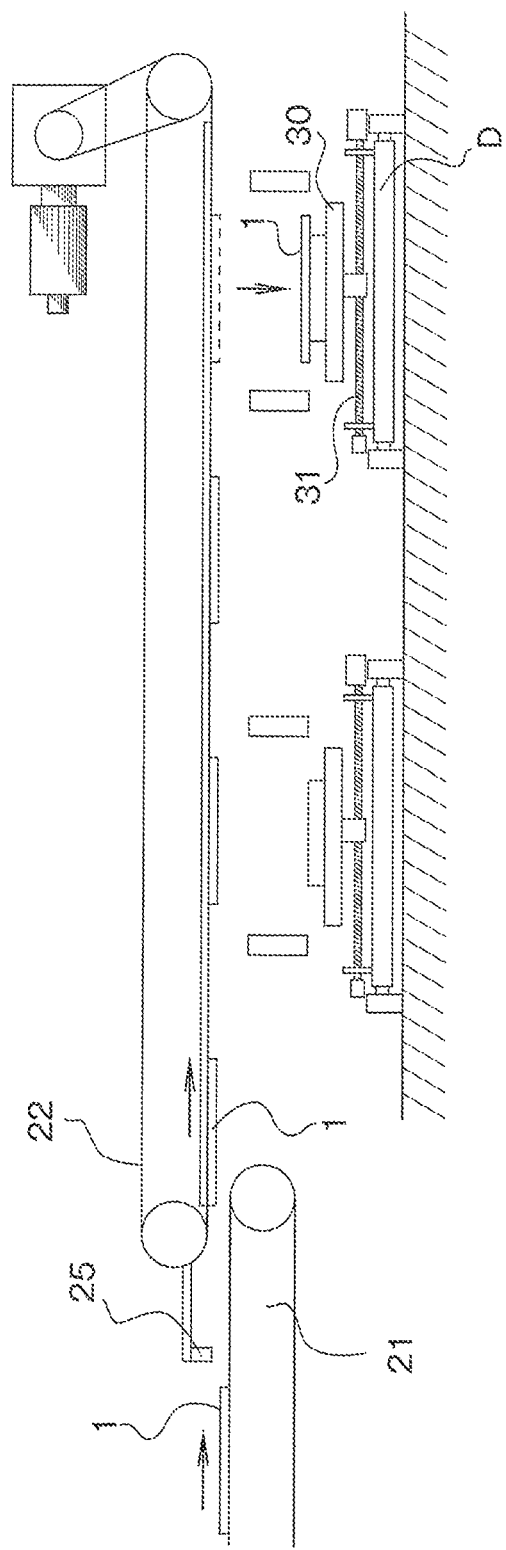

WORKPIECE LOADING METHOD

TECHNICAL FIELD

The present invention relates to a workpiece loading method and, in more detail, to a workpiece loading method excellent in productivity and capable of accurately loading a workpiece on a loading frame.

BACKGROUND ART

In the field of metal working, a process of cutting a long sheet body into workpieces each in a desired size and stacking these workpieces to make a so-called stack is performed.

Then, these workpieces in a stack state are conveyed to a predetermined metal working machine, are taken from the stack one by one, and are subjected to metal working such as press working.

Meanwhile, in the process of stacking workpieces to make a stack, it is desired to quickly and accurately stack workpieces without damage.

For example, as a workpiece loading method, a method using a magnet-attraction-type conveyor has been known in which magnetic sheet bodies made of a magnetic material supplied from a device of the previous process are sequentially conveyed above a multilayered part as being attracted to a belt by a plurality of electromagnetic magnets and dropped onto the multilayered part (for example, refer to PTL 1).

Also, a metal sheet conveying method has been known in which metal sheets obtained by cutting by a blanking press are conveyed by a runout conveyor, are transferred by being magnetically attracted to a magnetically-attracting belt of a piler conveyor with a plurality of electromagnetic magnets continuously disposed, and then are conveyed by a piler conveyer and dropped by causing the magnetic force of the electromagnetic magnets to be lost at a piling position straight above a loading part to be sequentially loaded on the loading part (for example, refer to PTL 2).

CITATION LIST

Patent Literature

PTL 1: Japanese Patent Application Laid-Open No. 2005-179031
PTL 2: Japanese Patent No. 5483441

SUMMARY OF INVENTION

Technical Problem

However, in the conventional workpiece loading methods including the methods described in PTL 1 and PTL 2 mentioned above, since a first conveyor and a second conveyor are intermittently operated, efficiency is poor in view of productivity.

On the other hand, if the first conveyor and the second conveyor are both continuously operated, for example, when a workpiece is dropped, there is a problem in which the workpiece may hit a wall or the like with great force and may be damaged.

The present invention was made in view of the above-described circumstances, and has an object of providing a workpiece loading method excellent in productivity and capable of accurately loading a workpiece on a loading frame.

Solution to Problems

With diligent studies for solving the above-described problems, the inventor has found that the above-described problems can be solved by continuously operating a first conveyor, intermittently operating a second conveyor, and setting a first speed of the first conveyor and a second speed of the second conveyor at an equal constant speed when performing a first step, a second step, a third step, and a fourth step, thereby completing the present invention.

The present invention resides in (1) a workpiece loading method using a piler conveyor comprising a first conveyor which sequentially conveys workpieces by continuous operation at a first speed, a second conveyor which magnetically attracts, on a lower surface, workpieces passed from the first conveyor for sequential conveyance by intermittent operation, and a loading frame where the workpieces are placed, the method consist of a first step of gradually accelerating the second conveyor to the second speed, a second step of operating the second conveyor at the second speed and passing the workpieces from the first conveyor to the second conveyor, a third step of gradually decelerating the second conveyor from the second speed for operation, and a fourth step of stopping the second conveyor and causing the second conveyor to lose a magnetic force and dropping a workpiece positioned above the loading frame onto the loading frame, wherein the first speed and the second speed are set at an equal constant speed.

The present invention resides in the workpiece loading method described in the above-described (1) in which, (2) the first step, the second step, the third step, and the fourth step are sequentially and repeatedly performed.

The present invention resides in the workpiece loading method described in the above-described (1) or (2) in which, (3) an activation sensor which detects the workpiece is attached to the second conveyor, and the first step, the second step, the third step, and the fourth step are preformed based on a signal from the activation sensor.

The present invention resides in the workpiece loading method described in the above-described (3) in which, (4) the activation sensor is attached to a tip of an arm part provided so as to protrude from an end of the second conveyor to a first conveyor side.

The present invention resides in the workpiece loading method described in any one of the above-described (1) to (4) in which, (5) the loading frame is movable along a rail part provided so as to be parallel to a longitudinal direction of the second conveyor.

The present invention resides in the workpiece loading method described in the above-described (5) in which, (6) a plurality of said loading frames are provided.

The present invention resides in the workpiece loading method described in the above-described (5) or (6) in which, (7) the loading frame and the rail part are placed on a cart, and the cart is movable in a direction orthogonal to the longitudinal direction of the second conveyor.

The present invention resides in the workpiece loading method described in any one of the above-described (1) to (7) in which, (8) paired guides are provided at front and rear above the loading frame.

Advantageous Effects of Invention

In the workpiece loading method of the present invention, productivity can be improved by continuously operating the first conveyor, and the workpiece can be accurately loaded on the loading frame without damage by intermittently operating the second conveyor. That is, by performing the first step, the second step, the third step, and the fourth step, productivity is excellent, and the workpiece can be accurately loaded on the loading frame.

Also, as for delivery of workpieces between the first conveyor and the second conveyor in the second step, by setting the first speed of the first conveyor and the second speed of the second conveyor at an equal constant speed, the first step, the second step, the third step, and the fourth step can be performed smoothly without occurrence of errors.

In the workpiece loading method of the present invention, by sequentially and repeatedly performing the first step, the second step, the third step, and the fourth step, the workpieces can be continuously and efficiently loaded.

Here, an activation sensor which detects the workpiece is attached to the second conveyor and, by performing the first step, the second step, the third step, and the fourth step based on a signal from the activation sensor, automation can be achieved, and the workpieces can be more efficiently loaded.

Also, attached to the tip of the arm part provided so as to protrude from the end of the second conveyor to the first conveyor side, the activation sensor can detect the workpiece before delivery. Therefore, the first step, the second step, the third step, and the fourth step can be performed with a margin.

In the workpiece loading method of the present invention, since the loading frame is movable along the rail part provided so as to be parallel to the longitudinal direction of the second conveyor, the loading frame can be moved in accordance with the dropping position of the workpiece.

In the workpiece loading method of the present invention, since the plurality of loading frames are provided, stage replacement can be easily performed by alternate use.

Here, when the loading frame and the rail part are placed on the cart and the cart is movable in a direction orthogonal to the longitudinal direction of the second conveyor, easy export can be made from the piler conveyor.

In the workpiece loading method of the present invention, since paired guides are provided at front and rear above the loading frame, it is possible to prevent the workpiece from being loaded at a position shifted from the loading frame when the workpiece drops.

BRIEF DESCRIPTION OF DRAWINGS

FIG. 4(c) is a descriptive diagram for describing the workpiece loading method according to the present embodiment.

FIG. 5 is a graph depicting a relation between conveying speed of a second conveyor and time in the workpiece loading method according to the present embodiment.

FIG. 6 is a descriptive diagram for describing a workpiece loading method according to another embodiment.

DESCRIPTION OF EMBODIMENTS

Figure 1:
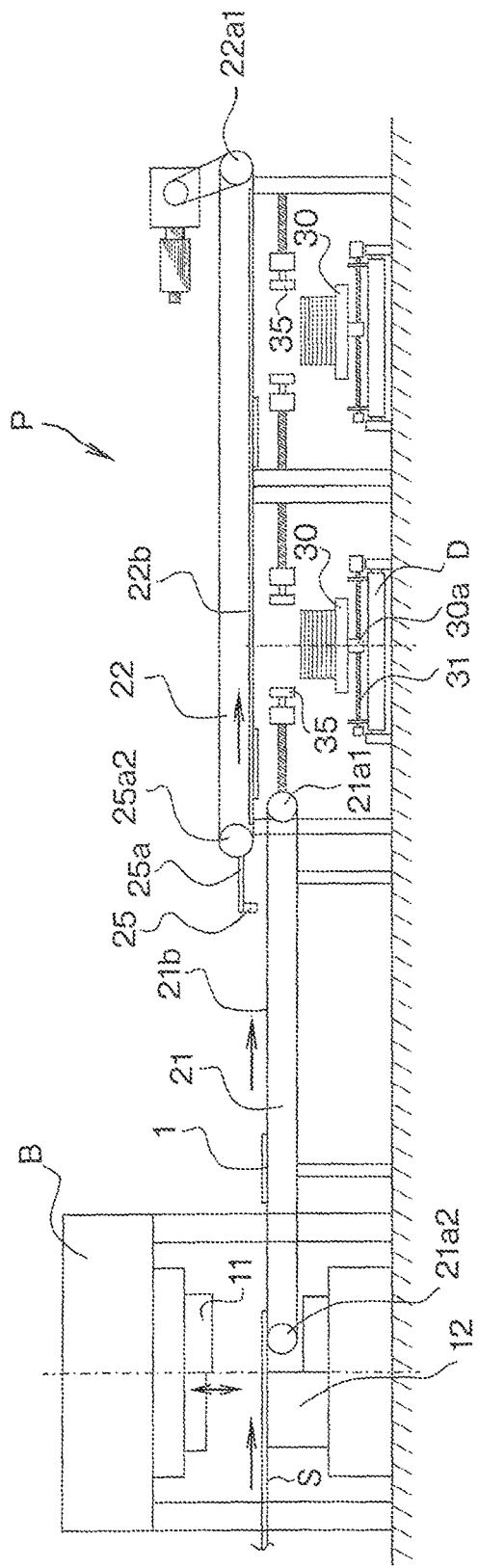
FIG. 1 is a side view depicting a general outline of a blanking press for cutting workpieces and a piler conveyor where a workpiece loading method according to the present embodiment is performed.

In the following, with reference to the drawings as required, preferred embodiments of the present invention are described in detail. Note that, in the drawings, the same components are provided with the same reference numeral and redundant description is omitted. Also, a positional relation such as, above, below, left, and right are based on the positional relation depicted in the drawings, unless otherwise specified. Furthermore, the dimensional ratio in the drawings are not restricted to that depicted in the drawings.

In the workpiece loading method according to the present embodiment, a so-called piler conveyor is used. That is, the present invention is directed to a method of conveying workpieces obtained by cutting by a blanking press by using the piler conveyor and loading the workpieces on a loading frame.

FIG. 1 is a side view depicting a general outline of a blanking press for cutting workpieces and a piler conveyor where the workpiece loading method according to the present embodiment is performed.

As depicted in FIG. 1, a blanking press B includes a fixed lower blade 12 and an upper blade 11 in a shape corresponding to the lower blade 12.

In the blanking press B, the upper blade 11 makes ascending/descending movements with respect to the fixed lower blade 12, and a sheet body S can be cut by being interposing between the lower blade 12 and the upper blade 11.

Also, a first conveyor 21, which will be described further below, for conveying cut workpieces 1 is disposed near the lower blade 12 of the blanking press B.

A piler conveyor P includes the first conveyor 21 which sequentially conveys the workpieces 1 by continuous operation, a second conveyor 22 which magnetically attracts, on a lower surface, the workpieces 1 passed from the first conveyor 21 for sequential conveyance by intermittent operation, and loading frames 30 where the workpieces are placed.

The first conveyor 21 has a drive shaft $21a1$, a driven shaft $21a2$, and a belt $21b$ in an endless shape via the drive shaft $21a1$ and the driven shaft $21a2$, and places the workpiece 1 obtained by cutting by the blanking press B on the belt $21b$ for conveyance by continuous operation to the second conveyor 22. Note that continuous operation is operation of continuously moving at a constant speed without stopping the belt $21b$.

Below an end on an upstream side of the second conveyor 22 in a predetermined distance, an end on a downstream side of the first conveyor 21 is disposed. That is, the end of the second conveyor and the end of the first conveyor 21 are disposed so as to vertically overlap.

The second conveyor 22 has a drive shaft $22a1$, a driven shaft $22a2$, and a magnetically-attracting belt $22b$ in an endless shape via the drive shaft $22a1$ and the driven shaft $22a2$, and magnetically attracts the workpiece 1 transferred from the first conveyor 21 below the magnetically-attracting belt $22b$ for conveyance to a predetermined position by intermittent operation. Note that the intermittent operation is operation of alternately and repeatedly performing movement and stopping of the magnetically-attracting belt 22b.

In the second conveyor 22, an activation sensor 25 is provided at the end on the upstream side via an attachment frame not depicted.

Specifically, the activation sensor 25 is attached to a tip of an arm part 25a provided so as to protrude from the end of the second conveyor 22 on the upstream side to a first conveyor 21 side. In this manner, by being attached at the tip of the arm part 25a, the activation sensor 25 can detect the workpiece 1 before delivery with a margin.

The activation sensor 25 can detect a front end or a rear end of the workpiece 1 to be conveyed. Based on a detection signal from the activation sensor 25, a first step, a second step, a third step, and a fourth step, which will be described further below, are performed. Thus, each step can be automated, and the workpiece 1 can be more efficiently loaded.

Below the second conveyor 22, the loading frames 30 for loading the workpieces 1 are provided.

Here, in the piler conveyor P, two loading frames 30 are provided below the second conveyor 22 on the upstream side and the downstream side. Thus, by alternately using the respective loading frames 30, stage replacement can be easily performed.

Also, by alternately loading the workpieces 1 on the respective loading frames 30, loading of the workpieces 1 can be completed in a shorter time.

In the piler conveyor P, paired guides 35 are provided at front and rear above the loading frame 30. And, the guides 35 are provided between the second conveyor 22 and the loading frame 30. With this, for example, when the workpiece 1 drops, even if some error occurs and the workpiece 1 is shifted from the loading frame 30, the workpiece 1 can be reliably loaded on the loading frame 30 by being guided by the guides 35.

Figure 2:
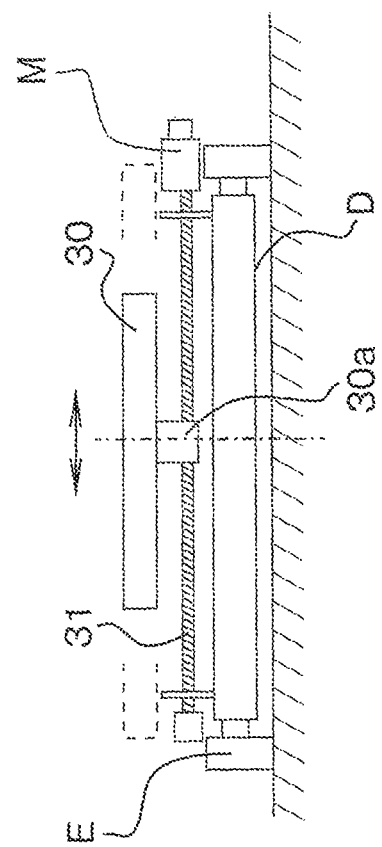
FIG. 2 is a side view depicting a general outline of a loading frame, a rail part, and a cart in the piler conveyor where the workpiece loading method according to the present embodiment is performed.

FIG. 2 is a side view depicting a general outline of the loading frame, a rail part, and a cart in the piler conveyor where the workpiece loading method according to the present embodiment is performed.

As depicted in FIG. 2, in the piler conveyor P, a rail part 31 is fixed below the loading frame 30 so as to be parallel to a longitudinal direction.

And, the loading frame 30 has a base part 30a attached to its lower surface, and is movable along the rail part 31 via the base part 30a.

With this, the loading frame 30 can be moved in accordance with a dropping position of the workpiece 1. Note that the above-described paired guides 35 are independently movable in the longitudinal direction of the second conveyor 22 and therefore can follow the movement of the loading frame 30.

Here, as a driving mechanism between the rail part 31 and the base part 30a, for example, a ball screw and a nut can be used.

Therefore, by a motor M provided at one end of the rail part 31, the rail part 31 corresponding to the ball screw rotates, thereby causing the base part 30a corresponding to the nut to move. Note that an encoder E is attached to the other end of the rail part 31 to allow the position of the base part 30a (loading frame 30) to be detected.

Incidentally, when the workpiece 1 to be loaded is replaced by one of a lot with a different length in the longitudinal direction, a conveying pitch of the workpieces 1 (a distance between the workpieces 1) is changed. Therefore, to drop the workpiece 1 onto the fixed loading frame 30, rapid acceleration and rapid deceleration are required when the workpiece 1 is conveyed. As a result, it becomes difficult to match timings of delivery and dropping of the workpiece 1. Moreover, the acceleration and deceleration capability of the second conveyor 22 also has a limit.

By contrast, as described above, when the loading frame 30 is movable, the loading frame 30 can be moved in accordance with an optimum dropping position of the workpiece 1. Therefore, even if the workpiece 1 is replaced by one in a lot with a different length in the longitudinal direction, it is possible to load the workpiece 1 by avoiding rapid acceleration and rapid deceleration.

In the piler conveyor P, the loading frame 30 and the rail part 31 are placed on a cart D. That is, the rail part 31 in this case is fixed to the cart D.

The cart D is movable in a direction orthogonal to the longitudinal direction of the second conveyor 22 (in a direction perpendicular to the paper face). For example, in a state in which the plurality of workpieces 1 (stack) are loaded on the loading frame 30, easy export can be made from the piler conveyor P.

Next, the workpiece loading method is described.

Figure 3:
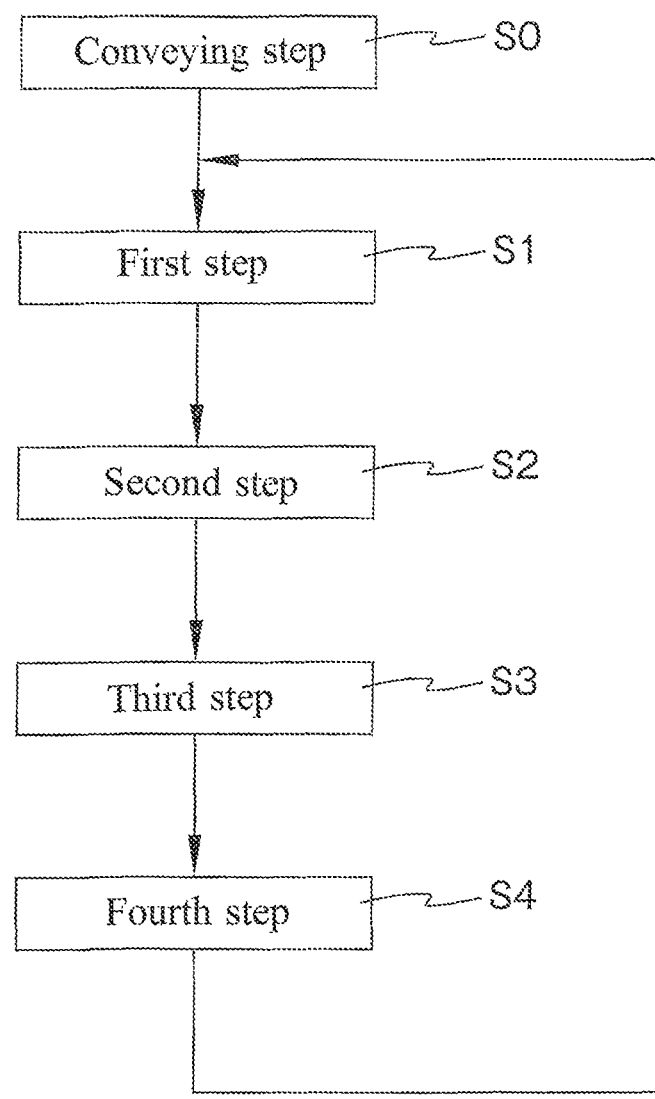
FIG. 3 is a flowchart depicting the workpiece loading method according to the present embodiment.

FIG. 3 is a flowchart depicting the workpiece loading method according to the present embodiment.

As depicted in FIG. 3, the workpiece loading method according to the present embodiment includes a conveying step S0 of conveying the workpieces 1 obtained by cutting by the blanking press B by continuous operation at a predetermined speed (for convenience, hereinafter referred to as a "first speed") by the first conveyor 21, a first step S1 of gradually accelerating the second conveyor 22 to a predetermined speed (for convenience, hereinafter referred to as a "second speed"), a second step S2 of operating the second conveyor 22 at the second speed and passing the workpiece 1 from the first conveyor 21 to the second conveyor 22, a third step S3 of gradually decelerating the second conveyor 22 from the second speed for operation, and a fourth step S4 of stopping the second conveyor 22 and causing the second conveyor 22 to lose a magnetic force and dropping the workpiece 1 positioned above the loading frame 30 onto the loading frame 30.

And, the first step S1, the second step S2, the third step S3, and the fourth step S4 are sequentially and repeatedly performed. With this, the workpieces 1 can be continuously and efficiently loaded.

In the following, each process is described in more detail.

Figure 4A:
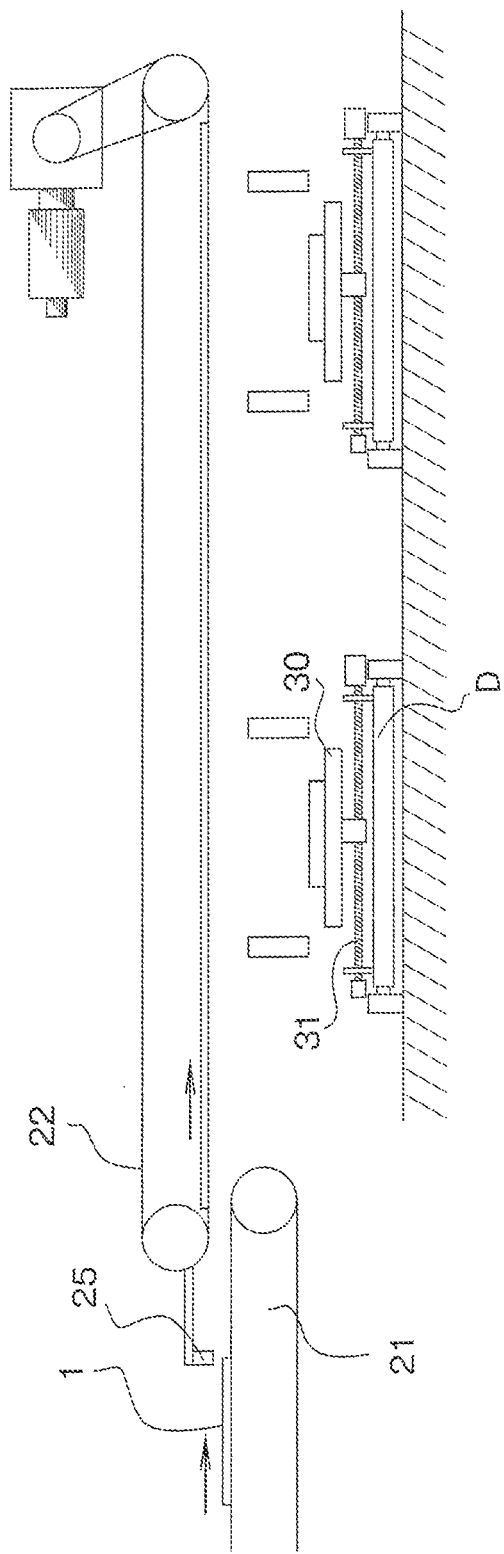
FIG. 4(a) is a descriptive diagram for describing the workpiece loading method according to the present embodiment.
Figure 4B:
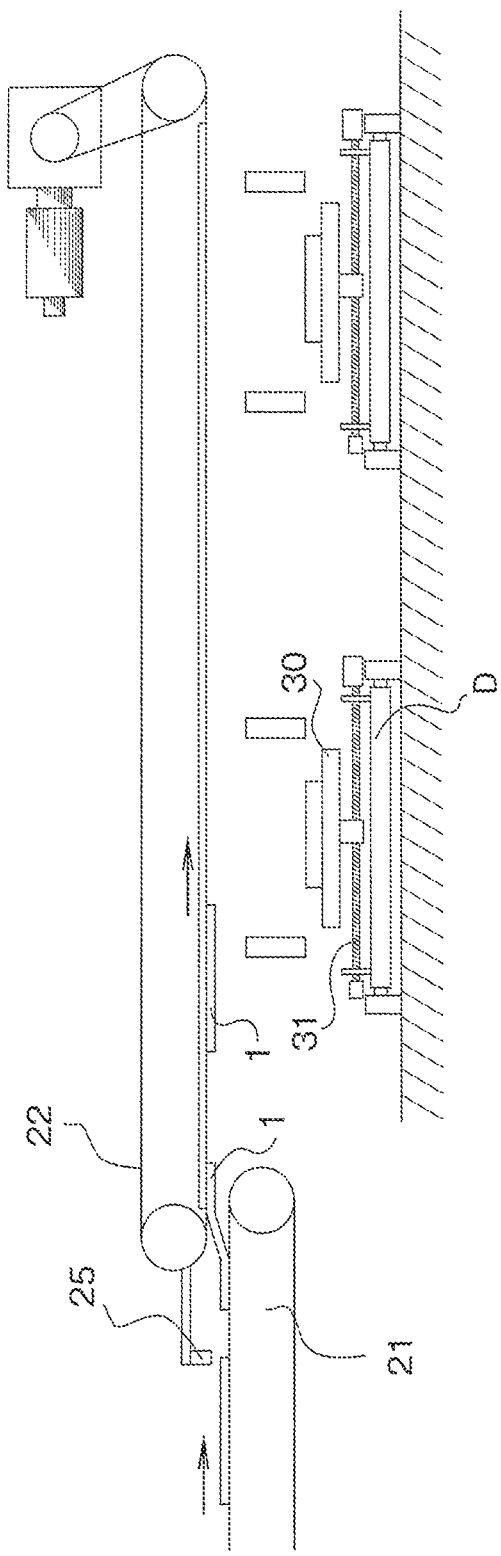
FIG. 4(b) is a descriptive diagram for describing the workpiece loading method according to the present embodiment.

FIG. 4(a) to FIG. 4(c) are descriptive diagrams for describing the workpiece loading method according to the present embodiment. Note that FIG. 4(a) to FIG. 4(c) depict a state in which one workpiece 1 (for convenience, hereinafter referred to as a "first workpiece 1") has already been conveyed by the second conveyor 22.

(Conveying Step)

The conveying step S0 is a step of dropping the workpiece 1 obtained by cutting by the blanking press B onto the first conveyor 21 for conveyance by the first conveyor.

Here, the first conveyor 21 conveys the workpieces 1 by continuous operation at the first speed. In this manner, since continuous operation is performed instead of intermittent one, productivity can be relatively improved.

(First Step)

The first step S1 is a step of gradually accelerating the second conveyor 22 to the second speed. Note that the acceleration here can be set as appropriate in consideration of the distance to the loading frame 30, the length of the second workpiece 1, and so forth.

In the first step S1, as depicted in FIG. 4(a), since the activation sensor 25 is attached to the second conveyor 22, for example, a tip of the workpiece 1 conveyed to the first conveyor 21 (for convenience, hereinafter referred to as a "second workpiece 1") is detected.

Then, based on a signal from the activation sensor 25, the stopping second conveyor 22 is activated, and is gradually accelerated and operated until reaching the second speed.

(Second Step)

The second step S2 is a step of operating the second conveyor 22 at the second speed and delivering the workpiece 1 from the first conveyor 21 to the second conveyor 22. Note that the second speed here is constant and equal to the first speed for the first conveyor to convey the workpiece.

In the second step S2, acceleration is halted, and operation is performed at the constant second speed.

Then, as depicted in FIG. 4(b), in a state in which the second conveyor 22 is operated at the second speed, the second workpiece 1 is delivered from the first conveyor 21. Here, as described above, since the first speed of the first conveyor 21 and the second speed of the second conveyor 22 are equal, delivery of the second workpiece 1 can be smoothly made without occurrence of errors.

(Third Step)

The third step S3 is a step of gradually decelerating the second conveyor 22 from the second speed for operation after the second workpiece 1 is delivered from the first conveyor 21. Note that the deceleration here can be set as appropriate in consideration of the distance to the loading frame 30, the length of the second workpiece 1, and so forth.

(Fourth Step)

The fourth step S4 is a step of stopping the second conveyer 22 and causing the second conveyer 22 to lose a magnetic force and dropping the workpiece 1 positioned above the loading frame 30 onto the loading frame 30.

In the fourth step S4, as depicted in FIG. 4(c), the second conveyor 22 is stopped so that the first workpiece 1 is positioned above the loading frame 30, and substantially simultaneously, is caused to lose a magnetic force to drop the first workpiece 1 onto the loading frame 30.

Note that, by contrast, the first conveyor 21 is in continuous operation, the next workpiece 1 (for convenience, hereinafter referred to as a "third workpiece 1") is conveyed.

In this manner, one cycle is done by performing the fourth step S4, and the state returns to the state depicted in FIG. 4(a). That is, after one cycle, the first workpiece in FIG. 4(a) corresponds to the second workpiece, and the second workpiece corresponds to the third workpiece.

FIG. 5 is a graph depicting a relation between conveying speed of the second conveyor and time in the workpiece loading method according to the present embodiment.

In the second conveyor 22, at the speed depicted in FIG. 5, the first step S1, the second step S2, the third step S3, and the fourth step S4 are performed.

Here, acceleration in the first step S1 (a gradient of the graph in FIG. 5) and deceleration in the third step S3 (a gradient of the graph in FIG. 5) are preferably equal. In this case, it is advantageously easy to perform management.

In this manner, since the second conveyor 22 conveys the workpieces 1 by intermittent operation, the workpieces 1 can be accurately loaded on the loading frame 30 without damage.

From the above, in the workpiece loading method according to the present embodiment, the first conveyor 21 is continuously operated, and the second conveyor 22 is intermittently operated where the first step S1, the second step S2, the third step S3, and the fourth step S4 are performed. Thus, productivity is excellent, and the workpieces 1 can be accurately loaded on the loading frame 30.

And, after a sufficient amount of workpieces 1 is loaded on the loading frame 30, since the loading frame 30 and the rail part 31 are placed on the cart D, easy export can be made from the piler conveyor P by moving the cart.

While the embodiment of the present invention has been described in the foregoing, the present invention is not restricted to the above-described embodiment.

For example, while the workpiece 1 obtained by cutting by the blanking press B is conveyed by the piler conveyer P and loaded on the loading frame 30 in the workpiece loading method according to the present embodiment, a shear cutting apparatus, a laser cutting apparatus, an offline cleaning machine, or the like may be used in place of the blanking press B.

While the activation sensor 25 is provided at the end of the second conveyor 22 on the upstream side in the workpiece loading method according to the present embodiment, the attachment position of the activation sensor 25 is not particularly restricted.

Note that as the activation sensor 25, a camera, a proximity sensor, a distance sensor, a photo sensor, or the like is used as appropriate.

While two loading frames 30 are disposed below the second conveyor in the workpiece loading method according to the present embodiment, the number of loading frames is not particularly restricted, and one or three or more loading frames may be disposed.

While the paired guides 35 are provided at front and rear above the loading frame 30 in the workpiece loading method according to the present embodiment, the guides are not necessarily indispensable structures.

While the base part 30a is attached to the lower surface of the loading frame 30 and movement can be made along the rail part 31 via the base part 30a in the workpiece loading method according to the present embodiment, the rail part 31 is not necessarily an indispensable structure.

Also, while a ball screw is adopted as the driving mechanism between the rail part 31 and the base part 30a, this is not meant to be restrictive, and an air cylinder or a rack and a pinion may be adopted.

While the loading frame 30 and the rail part 31 are placed on the cart D in the workpiece loading method according to the present embodiment, the cart D is not necessarily an indispensable structure.

Also, while the cart D is movable in a direction orthogonal to the longitudinal direction of the second conveyor 22, the moving direction is not restricted to this.

While the loading frame 30 below the piler conveyor P on the upstream side is used (refer to FIG. 4) in the workpiece loading method according to the present embodiment, as depicted in FIG. 6, the loading frame 30 below the piler conveyor P on the downstream side may be used.

Also, both of the loading frames 30 can be simultaneously or alternately used.

INDUSTRIAL APPLICABILITY

The workpiece loading method according to the present invention can be used as, for example, a method of loading the workpiece 1 obtained by cutting by the blanking press B. In accordance with the workpiece loading method according to the present invention, productivity is excellent, and the workpieces 1 can be accurately loaded on the loading frame 30.

REFERENCE SIGNS LIST

1 . . . workpiece
11 . . . upper blade

12 . . . lower blade
21 . . . first conveyor
21a1, 22a1 . . . drive shaft
21a2, 22a2 . . . driven shaft
21b . . . belt
22 . . . second conveyor
22b . . . magnetically-attracting belt
25 . . . activation sensor
25a . . . arm part
30 . . . loading frame
30a . . . base part
31 . . . rail part
35 . . . guide
B . . . blanking press
D . . . cart
E . . . encoder
M . . . motor
P . . . piler conveyor
S . . . sheet body
S0 . . . conveying step
S1 . . . first step
S2 . . . second step
S3 . . . third step
S4 . . . fourth step

The invention claimed is:

1. A workpiece loading method using a piler conveyor comprising a first conveyor which sequentially conveys workpieces by continuous operation at a first speed, a second conveyor which magnetically attracts, on a lower surface, workpieces passed from the first conveyor for sequential conveyance by intermittent operation, and a loading frame where the workpieces are placed, the method using the piler conveyor comprising:

detecting, by an activation sensor, a front end of the workpiece being conveyed, the activation sensor being attached to a tip of an arm part that is attached to the second conveyor so as to protrude from the end of the second conveyor toward the first conveyor;

based on a signal from the activation sensor, performing:
a first step of gradually accelerating the second conveyor to a second speed;
a second step of operating the second conveyor at the second speed and passing the workpieces from the first conveyor to the second conveyor;
a third step of gradually decelerating the second conveyor from the second speed for operation; and
a fourth step of stopping the second conveyor and causing the second conveyor to lose a magnetic force and dropping a workpiece positioned above the loading frame onto the loading frame, wherein the first speed and the second speed are set at an equal constant speed, an end on a downstream side of the first conveyor and an end on an upstream side of the second conveyor are disposed so as to overlap vertically, the loading frame is movable along a rail part provided so as to be parallel to a longitudinal direction of the second conveyor, and a motor is provided at one end of the rail part and an encoder for detecting a position of the loading frame is attached to an other end of the rail part opposite to the motor.

2. The workpiece loading method using the piler conveyor according to claim 1, wherein the first step, the second step, the third step, and the fourth step are sequentially and repeatedly performed.

3. The workpiece loading method using the piler conveyor according to claim 1, wherein a plurality of said loading frames are provided.

4. The workpiece loading method using the piler conveyor according to claim 1, wherein the loading frame and the rail part are placed on a cart, and the cart is movable in a direction orthogonal to the longitudinal direction of the second conveyor.

5. The workpiece loading method using the piler conveyor according to claim 1, wherein paired guides are provided at front and rear in a longitudinal direction of the second conveyor above the loading frame.

* * * * *